Feb. 2, 1943. H. A. COWLES ET AL 2,309,753
DISPLAY CARTON
Filed Feb. 3, 1941
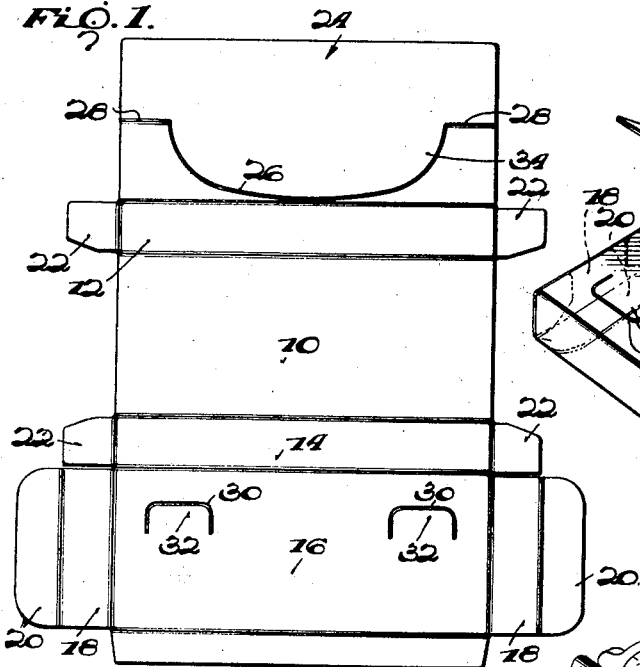
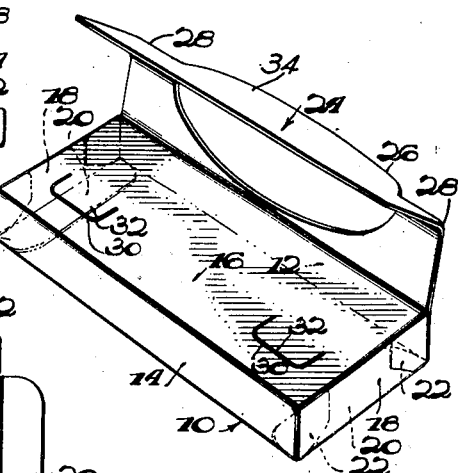
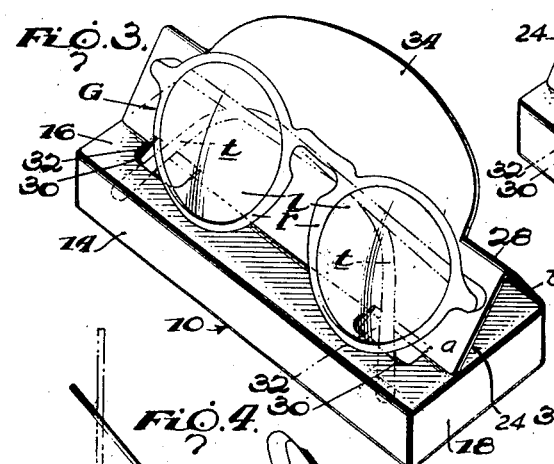
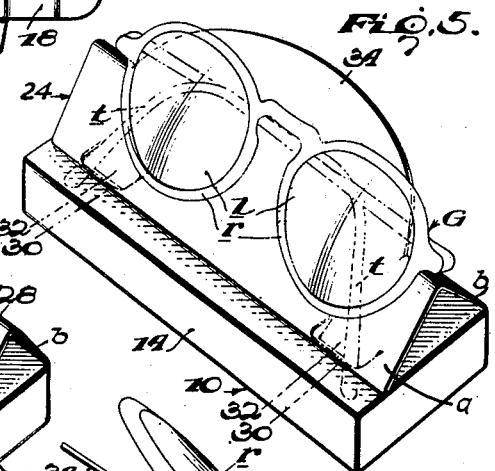
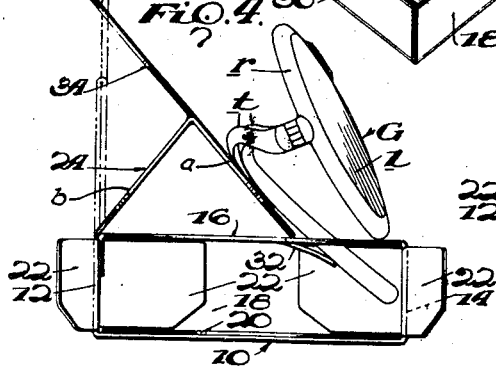
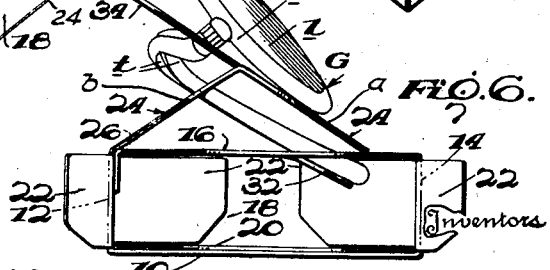
Inventors
Harold A. Cowles
Glenn W. Simpson
By
Attorney Patented Feb. 2, 1943

2,309,753

UNITED STATES PATENT OFFICE 2,309,753

DISPLAY CARTON

Harold A. Cowles and Glenn W. Simpson, Rochester, N. Y.; said Cowles assignor to said Simpson Application February 3, 1941, Serial No. 377,256

1 Claim. (Cl. 206—44)

The improved display carton comprising the present invention is primarily adapted for use in the packaging and subsequent display of sun glasses, sport glasses, spectacles and other optical merchandise of this character. The invention, however, is capable of other uses and the display carton may if desired be employed for packaging and displaying a variety of other articles of merchandise such as toilet articles, jewelry and the like.

The principal object of the invention is to provide a combined carton and display form in which a relatively fragile article such as a pair of sun glasses or the like may be totally enclosed for shipping purposes, the carton having associated therewith display means whereby the glasses may be securely held in a fixed exposed position for display purposes.

Another object of the invention is to provide a carton of this character which, when employed for display purposes, will permit display of the glasses in various ways for the purpose of variety as well as for utilitarian purposes. In carrying out this last mentioned object the invention contemplates a display carton which, when folded or arranged in a certain manner will display the glasses in such a fashion that they are readily accessible to a prospective purchaser for the purpose of trial or demonstration, and which, when folded or arranged in another manner will display the glasses in such a manner as to hinder or prevent immediate easy access thereto while at the same time adequately displaying the same, thus discouraging theft of the glasses when in display position.

Another object of the invention is to provide such a display carton which, when in either of its display positions is held against collapse, either by its own inherent rigidity or by virtue of its association with the glasses which it serves to support and display, or both.

Yet another object of the invention is to provide a carton of this character which is attractive in its appearance and which when utilized in its display capacity, is provided with a placard portion which is conveniently exposed in the vicinity of the glasses and upon which the trade name of the glasses and other advertising literature may be printed or otherwise marked.

The provision of a display carton which may conveniently and inexpensively be formed from a single one-piece blank; one which is rugged and durable and which consequently is unlikely to get out of order; one which is possessed of a marked degree of rigidity, whether in its article-enclosing or in one of its article-displaying positions; one which may readily be converted from its article-enclosing to its article-displaying positions with facility; and one which is otherwise well adapted to perform the services required of it, are further desirable features that have been borne in mind in the production and development of the present invention.

Other objects and advantages of the invention, not at this time enumerated, will become readily apparent as the nature of the invention is better understood.

In the accompanying single sheet of drawings forming part of this specification:

Figure 1 is a plan view of a blank from which the improved display carton is manufactured.

Figure 2 is a perspective view of the partially folded carton in its article-enclosing position.

Figure 3 is a perspective view of the erected carton in one of its article-displaying positions.

Figure 4 is an end view of the erected carton shown in Figure 3, the forward end flaps of the carton being left open to more clearly view the nature of the invention.

Figure 5 is a perspective view similar to Figure 3 showing the carton in another article-displaying position, and Figure 6 is an end view of the erected carton shown in Figure 5, the forward end flaps of the carton being left open to more clearly view the nature of the invention.

In all of the above described views, like characters of reference are employed to designate like parts throughout.

Referring now to the drawing in detail, the carton is formed from the blank shown in Figure 1 and includes a bottom wall 10; front and rear walls 12 and 14 respectively; a top wall 16; hinged closure flaps providing end walls 18, insertion tabs 20, and ears 22; and a display flap 24 which, when the carton is erected but in its closed position, overlies the top wall 16 and is substantially coextensive therewith.

The display flap 24 is formed with a scored portion or cut along the curved arc indicated at 26 and is also formed with crease lines 28 at the ends of the scored or cut portion 26. While the score or cut at 26 is shown as a circular arc, it will be understood that it may be of any suitable shape and relative size for display purposes as will appear presently.

The top portion 16 of the carton is formed with a pair of score or cut lines 30 adjacent the forward edge thereof providing depressible tabs 32, the function of which will also be set forth presently.

Referring now to Figure 2 it will be seen that in the erected article-enclosing position of the carton the article which is packaged, which in the present instance for illustrative purposes is a pair of sun glasses, is completely enclosed within the confining walls of the carton structure and is completely hidden from view.

When it is desired to display the sun glasses on a counter or other suitable support, the display flap 24 may be extended and caused to assume the positions shown in Figures 3, 4, 5, and 6.

In Figures 3 and 4, the display flap 24 is bent along the crease lines 28 to form front and rear downwardly diverging portions $a$ and $b$. When the flap 24 is thus bent the portion 34 is freed along the score line 26 and assumes an upstanding position lying in the plane of the front portion $a$ of the bent flap 24 when the carton is set up for display purposes. The sun glasses are designated at G and the folded temple portions $t$ thereof have their ends inserted in the recesses provided by depressing the tabs 32, while the lower edges of the rims $r$ are supported on the carton top 16.

When the sun glasses G are thus displayed, the bent display flap 24 is held by the weight of the glasses in the position indicated in Figure 3 and any suitable advertising matter (not shown) printed on the flap 24 and the extension 34 thereof is visible above the displayed article while a portion of this matter may be visible through the transparent lenses $i$.

Still referring to Figures 3 and 4, the extension 34 of the flap 24 may if desired be moved to the dotted line position shown in Fig. 4 wherein it extends vertically with the aforesaid front and rear portions of the bent flap 24. The folded flap 24 is self-sustaining in this position due to frictional engagement between the lower free edge of the flap 24 and the horizontal surface of the wall 16.

In Figure 5 another manner of utilizing the carton for display purposes is shown. When the carton is set up in this manner the extended portion 34 is passed through the space existing between the folded temple rods and the plane of the lenses $l$, with the ends of the rods being received in the recesses provided by depressing the flaps 32. The temple rods thus remain substantially hidden from view while the rims $r$ and lenses $l$ overlie the inclined face of the front folded portion of the flap 24 and a part of the extension 34.

When the glasses are held in the display position of Figure 5, they are not readily accessible to the observer without at least materially disturbing the carton structure.

The invention is not to be limited to the exact arrangement of parts shown in the accompanying drawing or set forth in this description as various changes in the details of construction may be resorted to without departing from the spirit of the invention. Only insofar as the invention has particularly been pointed out in the accompanying claim is the same to be limited.

What is claimed is:

In a carton for packaging and displaying a pair of sun glasses or similar article, a foldable box body including a bottom wall, front and rear walls, closure flaps providing end walls and a top wall, said walls and flaps providing a closed rectilinear carton adapted to contain and completely conceal a packaged article, the top wall having flap covered openings adjacent the forward edge thereof, a display flap forming an extension of the rear wall and having a curved cut intermediate its edges forming an opening and a display extension to said display flap, the display flap being foldable longitudinally to provide front and rear portions diverging downwardly to the top wall with the front diverging portion of the display flap having its forward longitudinal edge lying adjacent said flap covered openings in the top wall of the carton, said display flap and display extension, upon folding the display flap, lying in the same inclined plane for the support of the sun glasses or similar article with the temple rods of said article forced through the flap covered openings in the top of the carton, the carton being closed completely, except for the flap covered openings in the top wall, when the folded display flap is in position to support the sun glasses or similar article.

HAROLD A. COWLES.
GLENN W. SIMPSON.